United States Patent
Zhang et al.

(10) Patent No.: US 7,808,522 B2
(45) Date of Patent: Oct. 5, 2010

(54) METHOD FOR CALLING VIDEO COMMUNICATION SERVICE BY VIDEO COMMUNICATION TERMINAL AND ASSOCIATED MESSAGE DATA FORM

(75) Inventors: Yufeng Zhang, Shenzhen (CN); Liquan Zhang, Shenzhen (CN); Yanqing Lin, Shenzhen (CN); Liu Fang, Shenzhen (CN); Jun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1450 days.

(21) Appl. No.: 10/373,062

(22) Filed: Feb. 26, 2003

(65) Prior Publication Data

US 2003/0147357 A1      Aug. 7, 2003

Related U.S. Application Data

(63) Continuation of application No. PCT/CN02/00063, filed on Feb. 6, 2002.

(30) Foreign Application Priority Data

Feb. 6, 2001    (CN) ................................ 01 1 02487

(51) Int. Cl.
  *H04N 7/14*    (2006.01)
(52) U.S. Cl. .............. 348/14.09; 348/14.08; 348/14.12; 370/260; 370/261
(58) Field of Classification Search ... 348/14.01–14.09, 348/14.1, 14.11, 14.12, 14.13; 370/260, 370/261; 709/204
  See application file for complete search history.

(56) References Cited

U.S. PATENT DOCUMENTS 5,530,472 A * 6/1996 Bregman et al. ......... 348/14.09
5,668,738 A * 9/1997 Ataras, III .................. 370/235
5,673,080 A   9/1997 Biggs et al.

(Continued)

FOREIGN PATENT DOCUMENTS

CN        A-1200216        11/1998

(Continued)

OTHER PUBLICATIONS

ITU-T H.243: "Procedures for establishing communication between three or more audiovisual terminals using digital channels up to 1920 kbit/s" International Telecommunication Union, Geneva, CH, Feb. 2000 (2000-2002), pp. 1-52, XP017401352, sec. 5.9.

(Continued)

*Primary Examiner*—Melur Ramakrishnaiah

(57)    ABSTRACT

The invention discloses a method for calling video communication service by video communication terminal. The method comprises the steps of: (a) a first video communication terminal launches a call to a multipoint control unit (MCU) and sends an conference information needed for convening a conference to the MCU through an In-Band channel established between both sides; (b) the MCU convenes the conference according to the conference information received. The invention also discloses a message data form for transferring information through an In-Band channel in a video communication service. The message data form comprises: a data starting mark field, a data type field, a data length field, a field for no less than one piece of sub-information, a data ending mark field and a cyclic redundancy check field.

19 Claims, 7 Drawing Sheets

U.S. PATENT DOCUMENTS

| | | | |
|---|---|---|---|
| 5,784,561 A * | 7/1998 | Bruno et al. | 709/204 |
| 6,157,401 A | 12/2000 | Wiryaman et al. | |
| 6,195,117 B1 * | 2/2001 | Miyazaki | 348/14.09 |
| 6,457,043 B1 * | 9/2002 | Kwak et al. | 709/204 |
| 6,687,234 B1 * | 2/2004 | Shaffer et al. | 370/260 |
| 6,754,322 B1 * | 6/2004 | Bushnell | 379/202.01 |
| 7,009,943 B2 * | 3/2006 | O'Neil | 370/260 |
| 2002/0103864 A1 * | 8/2002 | Rodman et al. | 709/204 |

FOREIGN PATENT DOCUMENTS

| | | |
|---|---|---|
| EP | 505659 A1 * | 9/1992 |
| EP | A-0691779 | 1/1996 |
| EP | A-0889629 | 1/1999 |
| JP | 07-184183 * | 7/1995 |
| JP | 410056513 A * | 2/1998 |
| WO | WO-A-9623388 | 8/1996 |
| WO | WO-A-0172022 | 9/2001 |

OTHER PUBLICATIONS

ITU-T F.702: "Multimedia conference services" International Telecommunication Union, Geneva, CH, Jul. 1996, pp. 1-28, XP017400583.

* cited by examiner

METHOD FOR CALLING VIDEO COMMUNICATION SERVICE BY VIDEO COMMUNICATION TERMINAL AND ASSOCIATED MESSAGE DATA FORM

This application is a continuation of International Application PCT/CN02/00063, filed Feb. 6, 2002, of which the entire disclosure of the pending, prior application is hereby incorporated by reference.

FIELD OF THE INVENTION

The invention relates to a video communication service technology in multimedia communication technology field.

BACKGROUND OF THE INVENTION

Video communication service is a multimedia service that synthesizes information such as voice, image and data etc. and makes long haul transmission of them. A video communication service may be a videoconference and includes three types of information: image, voice and data. A videoconference service can be seen as a conventional conference television service and is one kind of video communication services. The videoconference is one kind of communication modes for a conference held at two or many different sites. This telecommunication mode uses television technology and equipment, and through transmission channel to serve a conference.

Video communication service makes it is possible that when people communicate at different sites, they can hear voice of each other and can see images of each other. This enhances real feelings, sincere feelings and at site feelings of communication. Video communication service is used in military, politic, economic, education and health fields etc., and has reality, high efficiency and real time advantages. Video communication service provides an effective mean for communication, management and collaboration of decision making etc.

As shown in FIG. 1, in general a video communication service system is consisted of video communication terminals, transmission channels and multipoint control units (MCU), which will be described in the following, respectively.

A video communication terminal samples, compress codes and multiplexes image, voice and relating data signal, which happen at a conference site, then sends to a transmission channel. At the same time, the video communication terminal sorts, decodes a received video communication service signal and returns to the image, voice and data signal of the conference site where the signals originally happen. Further, the video communication terminal sends conference control signal (such as apply for speaking, apply for the control of a conference etc.) to a MCU, and executes control commands from the MCU for the site. The video communication terminal also makes capability exchange and mode switching with the MCU. A capability exchange means a procedure that both sides of the communication exchange the service capability, which they support respectively.

Physically, A transmission channel can be optical fiber, cable, microwave or satellite mode etc. The communication networks that are commonly used for video communication service are a public switcher telephone network (PSTN), a packet switched public data network (PSPDN) and a digital data network (DDN) etc. At present, broadband network based on ATM technology is developed rapidly, this gives video communication service a wider development area, such as ISDN network, IP network and IQ network. Further more, as the ISDN network and Internet are increasingly popular, video communication service has a better condition to spread rapidly general people.

There are different communication protocols for different communication networks. The H.323 is a member of H.32X family developed by ITU-T. Other members of H.32X family are used in different networks for implementing multimedia communication, such as H.324 for SCN, H.320 for ISDN, H321 and H310 for B-ISDN and H.322 for LAN with $Q_oS$ guarantee.

The H.323 recommendation is a standard for a multimedia conference system (also called H.323 conference system) based on a public switched network (PSN). The H.323 conference system supposes that the network which it bases on is a network without providing $Q_oS$ guarantee. Along with the rapid development of IP network, the H.323 standard is mainly applied in IP network. An important purpose of H.323 standard is to interconnect with multimedia services on other networks, and this is performed by a gateway. In H.323 network, one important optional component is gatekeeper (GK), which can be understood as a "brain" of the network and is a focus of all internal calls in the H.323 network.

As shown in FIG. 1, MCUs are the control kernel of a video communication service system. When terminals attending a conference are more than two, they must be controlled by a MCU. All terminals are connected to a MCU with standard interface. A MCU implements exchange and mixture of image and voice, and all conference control functions according to the international standards: H.221, H.242, H.243 and T.120 etc.

In present technology, a video communication service is implemented that before a conference has been convened, resources must be pre-allocated in MCUs between all sites of the conference. This means that before convening a videoconference, a conference and its sites are defined in a MCU, the conference is controlled by the MCU, and resources are distributed accordingly. Once resources are satisfied, the conference can be convened. Obviously, this kind of operation mode cannot satisfy a requirement of video communication service providing publicly. The disadvantages are as follow. First, from the service provider point of view, it is necessary to have a special operator to control the MCU, to define a conference and sites, to manage the conference. This will greatly decrease efficiency of a video communication service network and limit profit of a video communication service system. Secondly, from the user point of view, a user must take a phone call or go to a video communication service office to schedule a conference, then the staffer of the office informs a MCU operator to call the conference at the scheduled time. This not only cannot provide real time service, but also less of security.

SUMMARY OF THE INVENTION

The purpose of the invention is to provide a method for calling a video communication service by a video communication terminal and a message data form used in the method.

The first aspect of the invention is to propose a method for calling a video communication service from a video communication terminal, when MCUs and video communication terminals are connected through communication network; it is characterized that comprising the following steps:

(a) a first video communication terminal launches a call to a MCU and sends to the MCU a conference information needed by calling a conference (for convenient reference, named SiteCall information hereinafter, the Site- Call means a conference calling process called from user side or video communication terminal) through an In-Band channel established between both sides;

(b) the MCU convenes the conference according to the conference information received.

Between steps (a) and (b) the following steps can be involved. The MCU retransmits the conference information to a service management center. The service management center dispatches related MCUs resources for the conference. Then the service management center sends the conference information to the related MCUs and instructs the MCUs to convene the conference.

In this article, an In-Band mode means a communication channel inside the service bandwidth; an Out-of-Band mode means a communication channel outside the service bandwidth. An In-Band channel can be: a MLP (Multi-Layer Protocol) channel, a H-MLP (High-speed Multi-Layer Protocol) channel, a LSD (Low Speed Data) channel, a HSD (High Speed Data) channel, a BAS (Bit Allocation Signaling) channel or an IP channel which is used for multimedia service in IP network and coincides with the H.323 specification.

The conference information is transferred by a specific message data form.

The conference information includes sub-information for a conference, sub-information for sites and common sub-information for a conference and sites.

The first video communication terminal can be seen in default as the chairman video communication terminal of a conference.

The second aspect of the invention is to provide a method for calling a video communication service from a video communication terminal, when MCUs and video communication terminals are connected through IP communication network; it is characterized that comprising the following steps:

(a') a first video communication terminal located in a IP network establishes a channel with a GK of the IP network and sends conference information needed for convening a conference to the GK;

(i') the GK retransmits the conference information to a service management center, which dispatches related MCUs resources for the conference and sends the conference information to the related MCUs, then instructs the MCUs to convene the conference;

(b') The MCUs convene the conference according to the conference information received.

The third aspect of the invention is to provide a message data form that is used for information transmission through In-Band channels in a video communication service. The message data form is characterized that includes sequentially: a data starting mark field, a data type field, a data length field, a field for no less than one piece of sub-information, a data ending mark field and a cyclic redundancy check field.

The sub-information field includes sequentially: a sub-information type field, a sub-information length field and a sub-information data field.

The invention is used but not limited in the following situations:

1. an E1 terminal convenes a conference with a transmission network;
2. an ISDN terminal convenes a conference with a PSTN network;
3. a H.232 terminal convenes a conference with an IP network.

The disadvantages of the present implementation of a video communication service are in a great degree originated from the followings. A user launches a video communication service in an Out-of-Band mode. The conference control function and conference definition function is concentrated on a MCU, so efficiency of the MCU is low. Thus, efficiency of a video communication service network is low.

The invention separates conference control function and conference definition function, where the MCU implements conference control function and the video communication terminal implements conference definition function. The information for convening a conference and various control requirements during a conference are transferred to MCUs by video communication terminals through an In-Band mode. This kind of implementation, In-Band mode, for video communication service is named by us as caller convening conference mode (i.e. SiteCall mode). The caller convening conference mode is more suitable for popularized video communication service comparing with the present technologies.

The invention has broken through the conventional video-conference mode and has proposed a new technical thought, which implements a real separation of user and service provider. This gives a better technical basis for the spread and applying of the popularized video communication service. The caller convening conference technology implements In-Band mode, which is reliable and secure. In the caller convening conference technology, the right for convening a conference is moved to the user, so there is no need to have a special operator at MCU, i.e. an unmanned MCU. Consequently, a user use a video communication service likes to take a telephone call, and is flexible and convenient.

EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
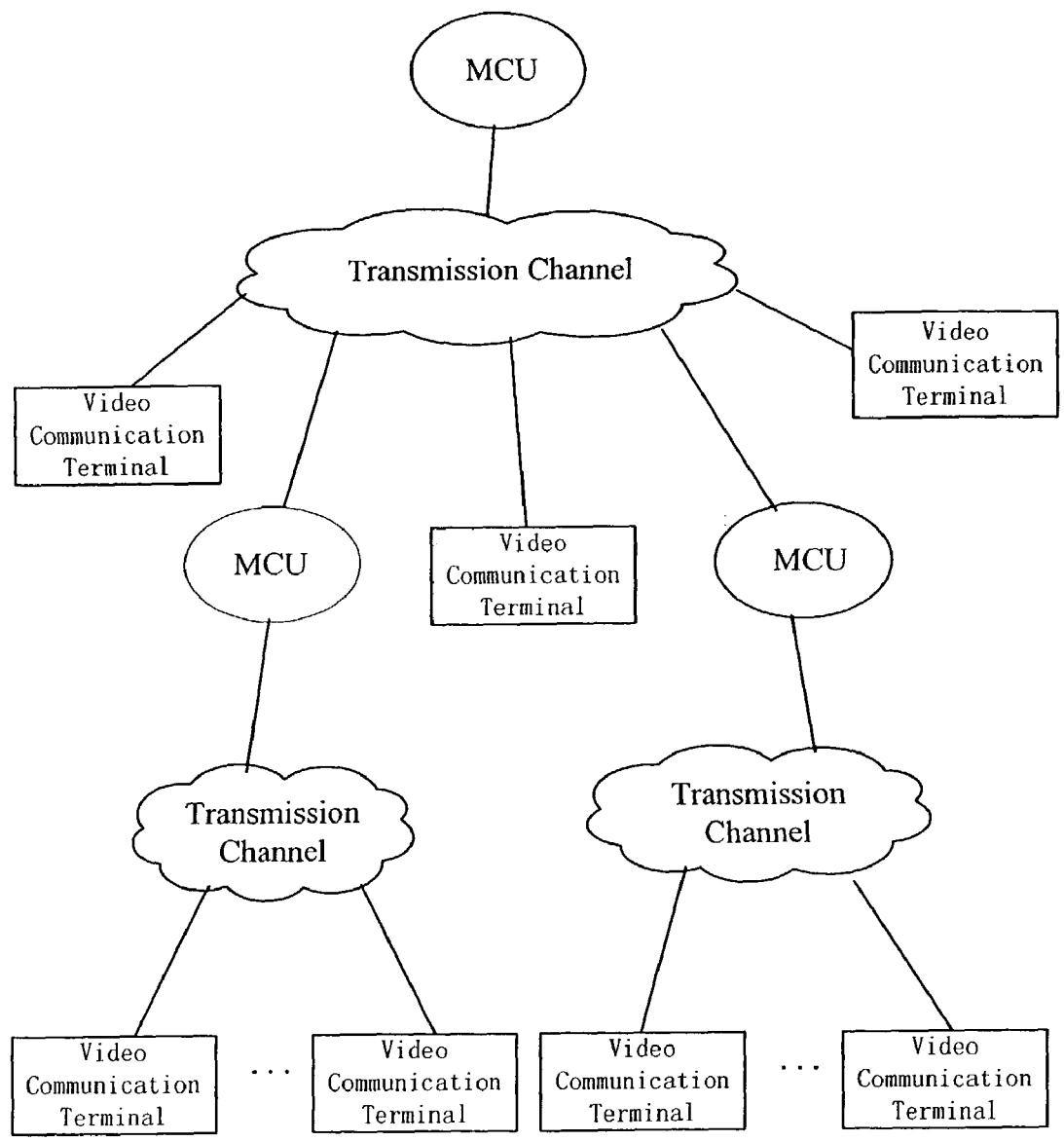
FIG. 1 shows a network connection mode for a video communication service system.

FIG. 1 shows a network connection mode for a video communication service system, which can be applied in the invention. The invention can also apply other types of network connection. FIG. 1 is only an example.

A method proposed by the first aspect of the invention for calling a video communication service from a video communication terminal, when MCUs and video communication terminals are connected through communication network, is characterized that comprising the following steps:
  (a) a first video communication terminal launches a call to a MCU and sends to the MCU a conference information through an In-Band channel established between both sides;
  (b) the MCU convenes the conference according to the conference information received.

Perfectly, the conference information is transferred with a specific message data form.

Perfectly, the conference information is transferred with a specific message data form, which includes sequentially: a data starting mark field, a data type field, a data length field, a field for no less than one piece of sub-information, a data ending mark field and a cyclic redundancy check field.

Perfectly, in the message data form, a specific bit in the data type byte is defined as an extended bit, the value of which defines whether the next byte is also a data type byte.

Perfectly, in the message data form, the sub-information field includes sequentially: sub-information type field, sub-information length field and sub-information data field.

Perfectly, in the sub-information field, a specific bit in the sub-information type byte is defined as an extended bit, the value of which defines whether the next byte is also a sub-information type byte.

Perfectly, the conference information includes sub-information for a conference, sub-information for sites and common sub-information for a conference and sites.

Perfectly, between steps (a) and (b) the following steps is involved. The MCU retransmits the conference information to a service management center. The service management center dispatches resources of related MCUs for the conference. Then the service management center sends the conference information to the related MCUs and instructs the MCUs to convene the conference.

Perfectly, the step (a) further comprises the following steps:
  (a1) a first video communication terminal launches a call to a MCU and establishes connection;
  (a2) the first video communication terminal sends a Site-Call capability mark to the MCU;
  (a3) the first video communication terminal and the MCU open their own In-Band channel definitely;
  (a4) the first video communication terminal sends the MCU a request for sending a SiteCall information;
  (a5) the MCU sends a response of the request for sending a SiteCall information to the first video communication terminal;
  (a6) when the first video communication terminal has received a positive response for sending a SiteCall information request, it sends a conference information needed for convening the conference to the MCU through the In-Band channel;
  (a7) the MCU sends a response for the SiteCall information to the first video communication terminal.

Perfectly, the In-Band channel is a MLP channel, a H-MLP channel, a LSD channel, a HSD channel or a BAS channel.

Perfectly, the In-Band channel has a 6.4 kbps rate.

Perfectly, the step (b) further comprises the following steps:
  (b1) according to the received conference information, the MCU makes capability exchange and mode switching with the first video communication terminal;
  (b2) according to the received conference information, the MCU calls other video communication terminals of the conference to attending the conference and starts a video communication service.

Perfectly, at the beginning of a conference the first video communication terminal is seen in default as the chairman video communication terminal of the conference.

Perfectly, the method of the invention further includes:
  (c) a chairman video communication terminal sends an adding conference sites information to the MCU through the In-Band channel between them;
  (d) the MCU sends an adding conference sites response to the chairman video communication terminal;
  (e) according to the adding conference sites information, the MCU establishes connection with video communication terminals to be added.

Perfectly, the method of the invention further includes:
  (c') a chairman video communication terminal sends an adding conference sites information to the MCU through the In-Band channel between them;
  (d') the MCU retransmits the conference information to the service management center. The service management center dispatches resources of related MCUs for the conference. Then the service management center sends the adding conference sites information to the related MCUs;
  (e') according to the adding conference sites information, the MCUs establish connection with video communication terminals to be added.

Perfectly, the method of the invention further includes the following steps:
  (f) a video communication terminal of a conference sends a control connection request to a MCU through In-Band channel, after authentication, the MCU receives or rejects the control connection request;
  (g) if in step (f), the control connection request is received, then the video communication terminal sends one or more than one conference control requests to the MCU through an In-Band channel;
  (h) the MCU makes response of conference control requests from the video communication terminal.

A message data form, proposed at the third aspect of the invention, is used for information transmission through In-Band channels in a video communication service. A message data form is characterized that includes sequentially: a data starting mark field, a data type field, a data length field, a field for no less than one piece of sub-information, a data ending mark field and a cyclic redundancy check field.

Perfectly, in the message data form, a specific bit in the data type byte is defined as an extended bit, the value of which defines whether the next byte is also a data type byte.

Perfectly, the sub-information includes sequentially: a sub-information type field, a sub-information length field and a sub-information data field.

Perfectly, a specific bit in the sub-information type byte is defined as an extended bit, the value of which defines whether the next byte is also a sub-information type byte.

Figure 2:
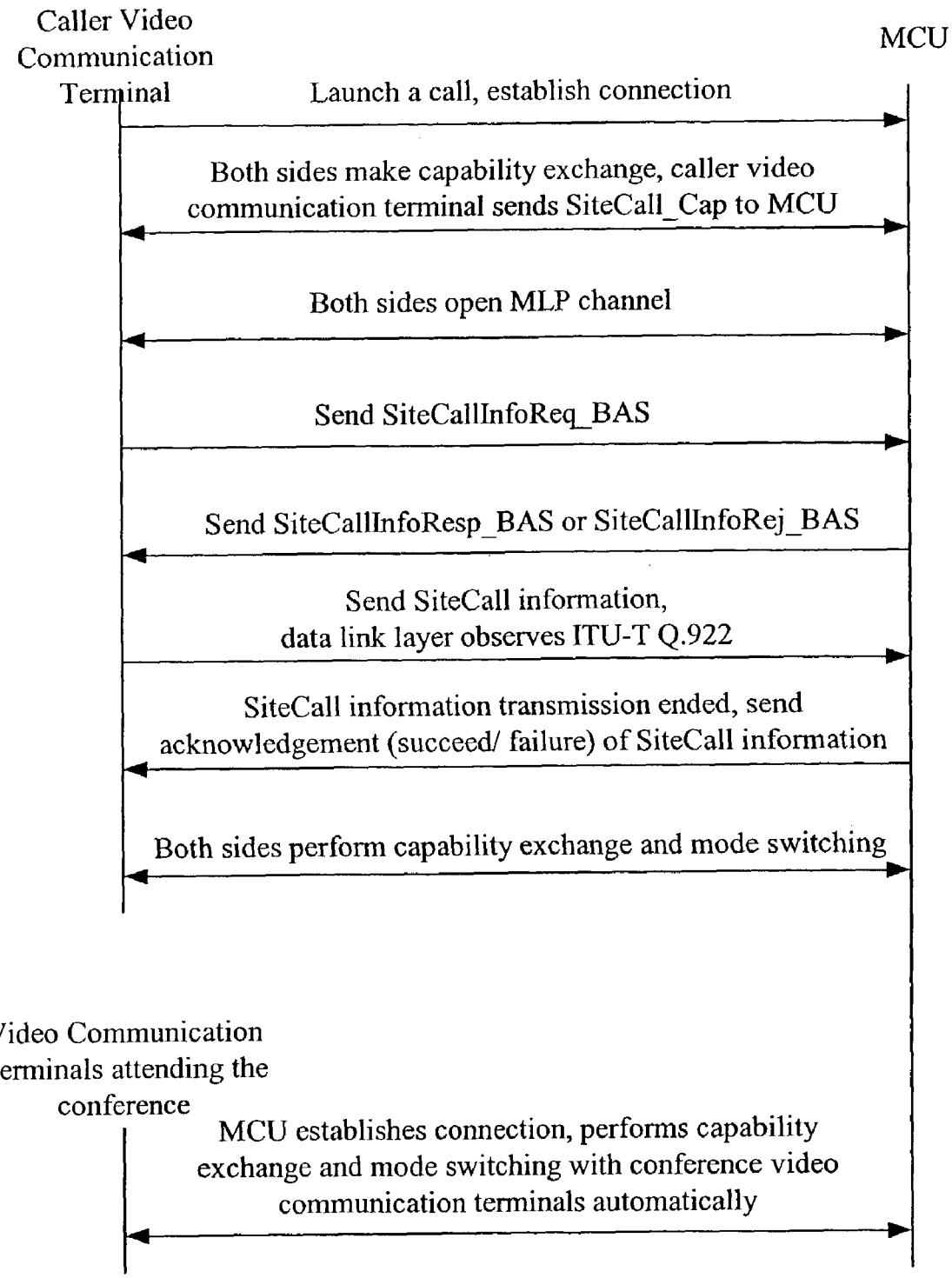
FIG. 2 shows a video communication terminal calls a video communication service procedure for the first embodiment of the invention.

FIG. 2 shows a video communication terminal calls a video communication service procedure for the first embodiment of the invention. A caller convening conference procedure is sequentially happened as follow. A video communication terminal (called first video communication terminal) as a caller video communication terminal calls a MCU and establishes connection with the MCU. During exchange capability between the first video communication terminal and the MCU, the first video communication terminal sends a SiteCall capability mark SiteCall_Cap to the MCU. Both sides, the video communication terminal and the exchange platform, are all definitely opened a MLP channel, and the bit speed can be 4 kbps, 6.4 kbps 8 kbps or 14.4 kbps with priority of 6.4 kbps. The first video communication terminal sends a sending SiteCall information request SiteCallInfoReq_BAS to the MCU. The MCU responds with the SiteCallInfoReq_BAS a receiving sending SiteCall information request SiteCallInfoResp_BAS to the first video communication terminal. Then, the first video communication terminal sends SiteCall information to the MCU. The data link layer deploys ITU-T Q.922 protocol and DCLCI 1 is used for SiteCall information transmission. After the SiteCall information has been transferred, the MCU sends a SiteCall response information to the first video communication terminal. The first video communication terminal and the MCU perform capability exchange and mode switching. The MCU establishes connection with other video communication terminals of the conference automatically.

In the first embodiment, the SiteCall capability mark SiteCall_Cap is a specific multiple bytes or single byte extended code. During capability exchange of two communication equipment, the SiteCall_Cap shows that the terminal needs to open the MLP channel for transferring SiteCall information after attending the conference.

The SiteCallInfoReq_BAS is a command sent to the MCU from the video communication terminal after MLP channel has been opened and shows SiteCall information will be transferred immediately. After the MCU has received the command, it guarantees that the MLP will not be occupied by other applications.

The SiteCallInfoResp_BAS sent to the video communication terminal from the MCU shows that the MCU is ready to receive SiteCall information. If for some reasons, such as MLP channel cannot be opened, the MCU cannot receive SiteCall information from the video communication terminal, then a reject response of SiteCall information SiteCallInfoRej_BAS is sent to the video communication terminal.

Figure 3:
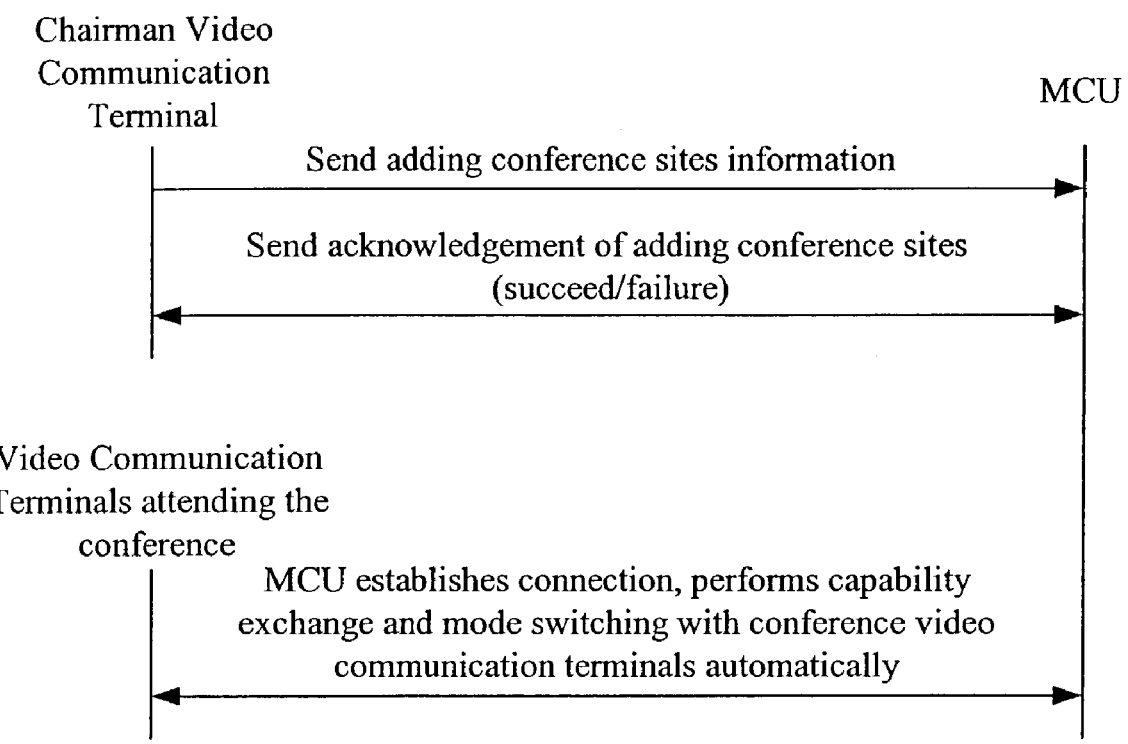
FIG. 3 shows adding conference sites procedure in a method that a video communication terminal calls a video communication service for the second embodiment of the invention.

FIG. 3 shows an adding conference sites procedure in a method that a video communication terminal calls a video communication service for the second embodiment of the invention. In this embodiment, the chairman video communication terminal has the right to add conference sites during a video communication service. As shown in FIG. 3, the adding conference sites procedure is sequentially happened as follow. The chairman video communication terminal sends an adding conference sites information to the MCU through the MLP channel. The MCU responds an acknowledgement message of the adding conference sites information to the chairman video communication terminal. Then, the MCU established connections with the new added video communication terminals automatically.

Figure 4:
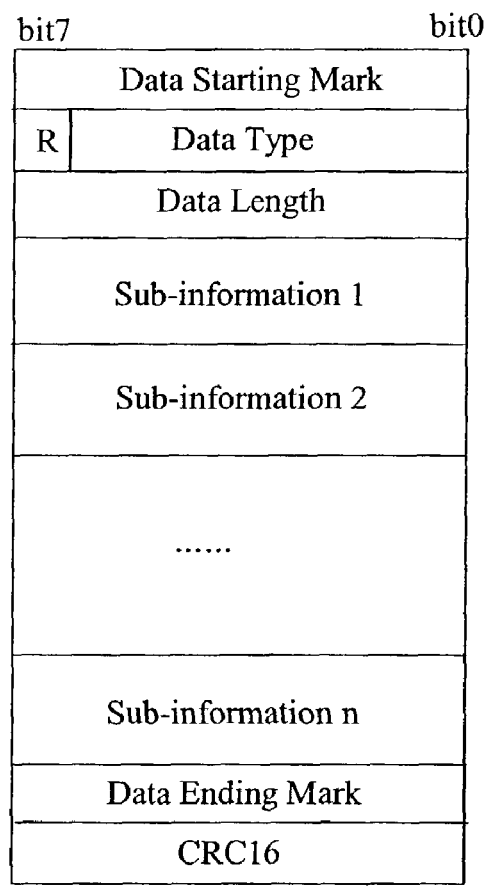
FIG. 4 shows an message data form for third embodiment of the invention.

FIG. 4 shows an message data form for third embodiment of the invention. The message data form includes sequentially: a data starting mark field, a data type field, a data length field, a field for no less than one piece of sub-information, a data ending mark field and a cyclic redundancy check field.

Refer to FIG. 4. The data starting mark 0xFE, taking one byte, shows start of an information data. The data type shows the type of an information data to be transferred. In FIG. 4, bit R is used for extension; when R is 0, then next byte is not a data type byte; and when R is 1, then next byte is also a data type byte. The data length field, taking two bytes, shows the total length of the information data to be transferred, including all control fields: the data starting mark field, the data ending mark field, the CRC field and all sub-information fields. The data ending field, taking one byte, 0xFD shows that the information data is ended. The CRC field is a cyclic redundancy check using CCITT 16 bits standard algorithm.

Figure 5:
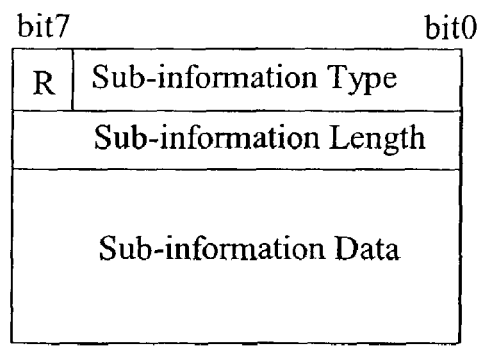
FIG. 5 shows a sub-information data form within an message data form for third embodiment of the invention.

FIG. 5 shows a sub-information data form within an message data form for third embodiment of the invention. The sub-information includes sequentially: a sub-information type field, a sub-information length field and a sub-information data field.

Refer to FIG. 5. The sub-information type field shows the data type of a sub-information. The R bit is used for extension; when R is 0, then next byte is not a sub-information type byte again; when R is 1, then next byte also belongs to the sub-information type field. The sub-information length, taking one byte, shows the length of the sub-information data. The sub-information data is the data brought in the sub-information packet.

Figure 6:
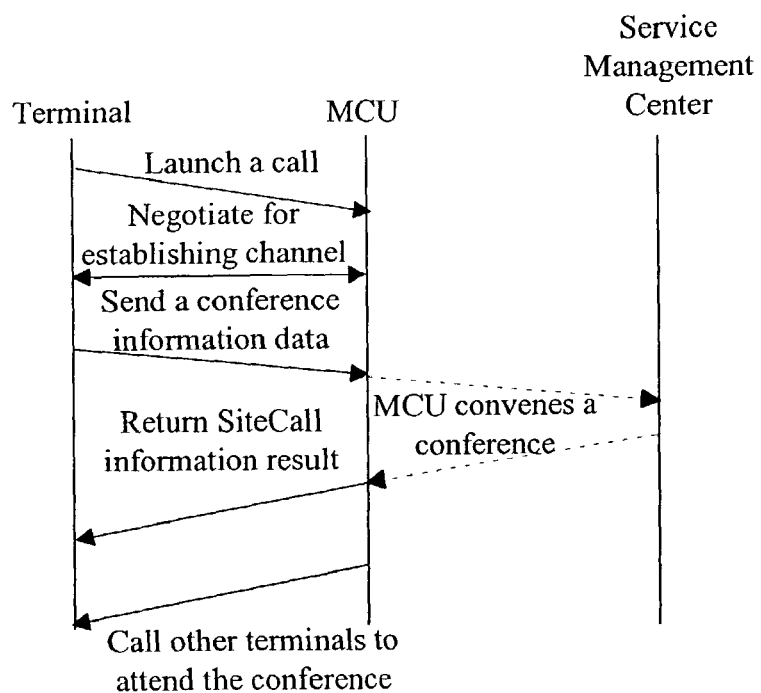
FIG. 6 shows that a video communication terminal calls a video communication service procedure for the forth embodiment of the invention.

FIG. 6 shows that a video communication terminal calls a video communication service procedure for the forth embodiment of the invention, wherein a video communication terminal is a H.320 terminal. As shown in FIG. 6, first the H.320 terminal launches a call and negotiates with a MCU for establishing a data transmission channel (such as MLP channel etc.), then sends the information of a conference to be convened to the MCU. As the conference may relate to more than one MCU, the MCU retransmits the conference information to a service management center, which will convene the conference and finally will return the result to the SiteCall terminal. After a conference has been launched, MCU can actively call other terminals of the conference to attend the conference. Of course, a terminal also can call MCUs to attend the conference. When the conference relates only one MCU, the conference information may not be sending to the service management center and the MCU convenes the conference itself.

Figure 7:
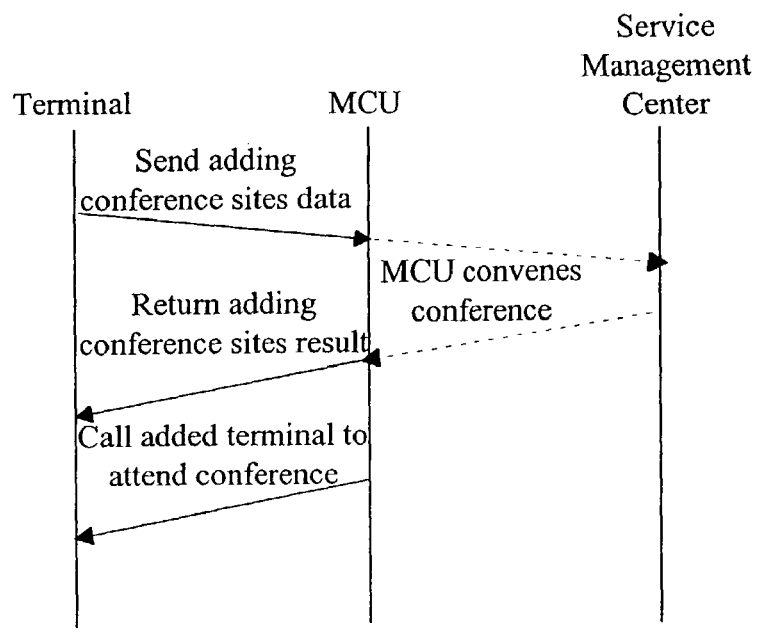
FIG. 7 shows adding conference sites procedure in a method that a video communication terminal calls a video communication service for the forth embodiment of the invention.

FIG. 7 shows adding conference sites procedure in a method that a video communication terminal calls a video communication service for the forth embodiment of the invention. The procedure is simpler, it uses the channel having been established for the conference to send the adding conference sites information. The simplest way is to use the BAS to send the adding conference sites information. In general, it is defined that only the chairman terminal can perform the adding conference sites operation.

Figure 8:
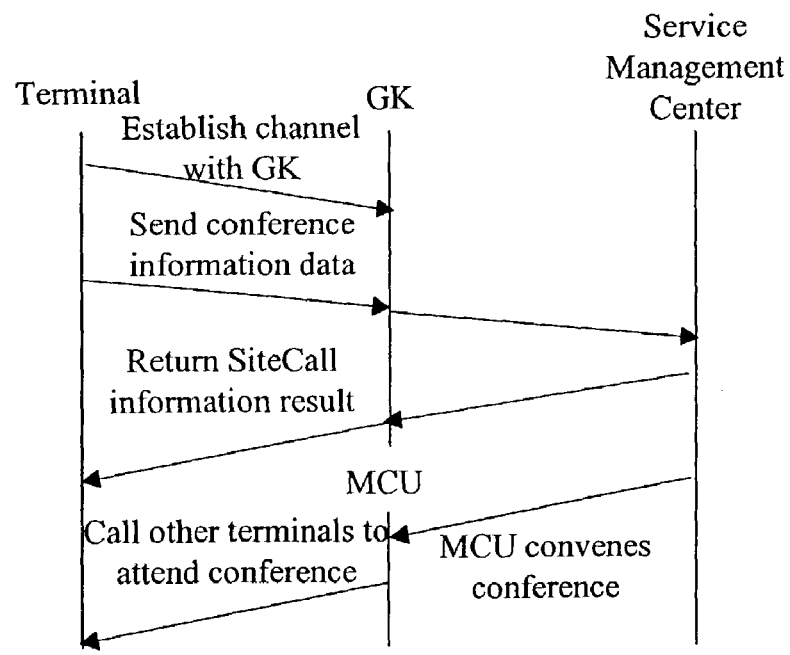
FIG. 8 shows a video communication terminal calls a video communication service procedure for the fifth embodiment of the invention.

FIG. 8 shows a video communication terminal calls a video communication service procedure for the fifth embodiment of the invention, i.e. in IP network a H.323 terminal makes a calling conference procedure. In IP network, the calling conference procedure of H.323 may be identical with the calling conference procedure of H.320, i.e. using the calling conference procedure of H.320. In considering that in general a H.323 terminal communicates with GK first (for registration), a better mode is applied. The mode is that SiteCall information of H.323 can be transferred through GK. Then, the GK sends the SiteCall information to the service management center to convene a conference.

Figure 9:
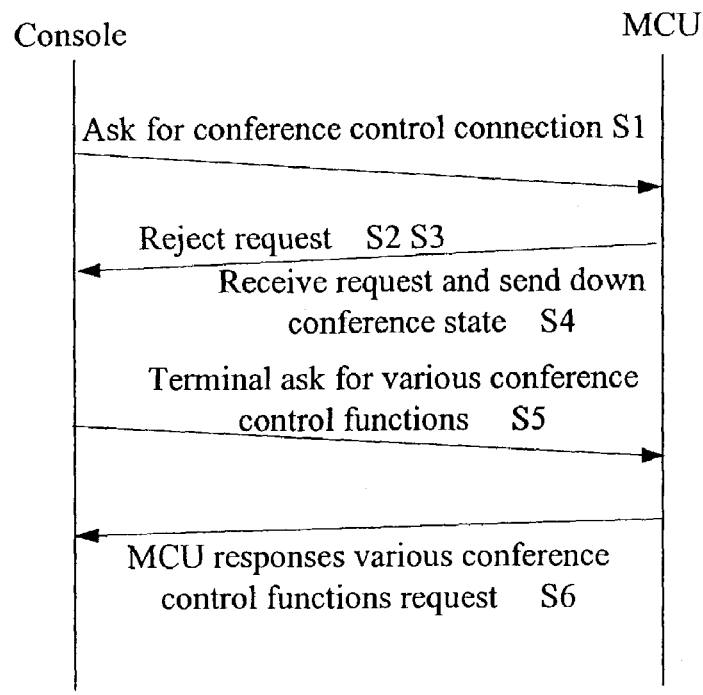
FIG. 9 shows a H.323 terminal controls a conference procedure in a method that a video communication terminal calls a video communication service for the fifth embodiment of the invention.

FIG. 9 shows a H.323 terminal controls a conference procedure in a method that a video communication terminal calls a video communication service for the fifth embodiment of the invention. In this embodiment, a H.323 terminal applies to the MCU for various control functions of a conference by using console software.

Controlling a conference through console software comprises the following steps:

S1 (step1). When a conference has been convening and a H.323 terminal has been attending the conference; by obtaining a conference control connection address in the MCU, the console sends a conference control connection request to the address. The request includes the connected H.323 terminal information and the conference control password.

S2 (step2). When the MCU has received the request, whether there is the conference control connection of the terminal is decided. If there is the conference control connection of the terminal, the conference control connection request is rejected and the operation is ended.

S3 (step3). When there is not the conference control connection of the terminal, then decide whether the conference control password is correct. If it is not correct, then an error message is returned and this request is ended.

S4 (step4). The MCU accepts the conference control request of the console and sends the present conference state information to the console.

S5 (step5). After the console has received the message that MCU has accepted the request, the console can send various conference control functions to the MCU through the conference control channel.

S6 (step6). After the MCU has received a conference control application from the console, the MCU processes the conference control accordingly, and sends the conference state to the console through the conference control channel.

Figure 10:
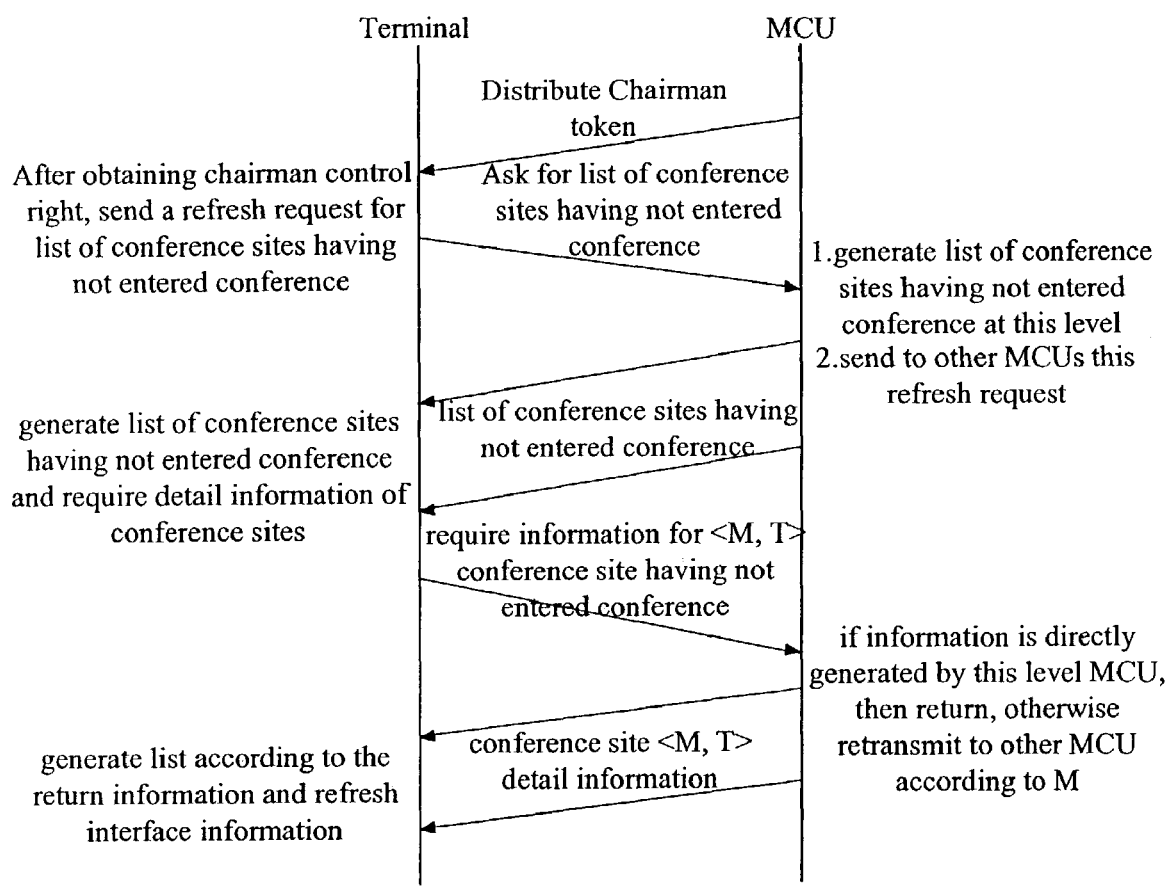
FIG. 10 shows a detail procedure in a video communication terminal for obtaining a list of conference sites having not entered the conference for the fifth embodiment of the invention.

In order to have a better control to a conference, it is needed to obtain conference sites having not entered the conference in a video communication terminal. FIG. 10 shows a detail procedure in a video communication terminal for obtaining a list of conference sites having not entered the conference for the fifth embodiment of the invention. After knowing the conference sites that have not entered the conference, a call or delete operation can be taken to those conference sites.

The invention discloses a method to implement calling a conference from a video communication terminal and to control the conference, and an message data form for data transmission through an In-Band channel. Comparing with the present technology, the invention has obvious advantages. First, from the service provider point of view, it is no need to have a special operator to control MCU and to cooperate with service office for defining a conference. The conference is automatically proceeded by the cooperation of video communication terminals and MCUs. This will greatly increase efficiency and get more profit of a video communication service system. Secondly, from the user point of view, for convening a conference, a user only needs to define the conference in a video communication terminal, then as simple as making a phone call, the video communication service is started in real time. This is not only avoiding a complex and tedious pre-registration procedure, but also increasing the expected security.

The embodiments, mentioned above, are used to describe the invention, but not to limit the invention. With reference to the description of the invention, any this field technician, who understands the invention, can make revision or equivalent replacement of the embodiments of the invention without separating from the spirit and scope of the invention. All these revisions and equivalent replacements are covered in the claims of the invention.

The invention claimed is:

1. A method for calling video communication service by video communication terminal, wherein at least one multi-point control unit (MCU) connects with video communication terminals through a communication network, the method comprising:
   (a) calling a MCU by a first video communication terminal;
   (b) establishing an In-Band channel between the first video communication terminal and the MCU;
   (c) sending conference information needed for convening a conference from the first video communication terminal to the MCU through the In-Band channel, wherein the conference information, which comprises sub-information for a conference, sub-information for conference sites, and common sub-information for a conference and conference sites, is defined in the first video communication terminal and transferred by a specific message data form; and
   (d) convening the conference by the MCU according to the conference information received.

2. The method according to claim 1, wherein the conference information is transferred by a specific message data form, which comprises: a data starting mark field, a data type field, a data length field, a field for no less than one piece of sub-information, a data ending mark field and a cyclic redundancy check field.

3. The method according to claim 2, wherein a specific bit in the data type field is defined as an extended bit, the value of which defines whether the next byte is also a data type byte.

4. The method according to claim 2, wherein the sub-information field comprises: a sub-information type field, a sub-information length field and a sub-information data field.

5. The method according to claim 4, wherein a specific bit in the sub-information type field is defined as an extended bit, the value of which defines whether the next byte is also a sub-information type byte.

6. The method according to claim 1, wherein between step (a) and step (d), the method further comprise:
   (i) retransmitting the conference information to a service management center by the MCU; dispatching resources of related MCUs by the service management center; sending the conference information to the related MCUs and instructing the MCUs to convene the conference by the service management center.

7. The method according to claim 6, further comprising:
   (c') sending an adding conference sites information to the MCU by a chairman video communication terminal through the In-Band channel between the chairman video communication terminal and the MCU;
   (d') retransmitting the conference information to a service management center by the MCU; dispatching resources of related MCUs for the conference and sending the adding conference sites information to the related MCUs by the service management center; and
   (e') establishing connection with video communication terminals to be added by the MCUs, according to the adding conference sites information.

8. The method according to claim 1, wherein the step (a) further comprises:
   (a1) calling a MCU by a first video communication terminal and establishing connection with the MCU;
   (a2) sending a SiteCall capability mark to the MCU by the first video communication terminal;

(a3) opening their own In-Band channel definitely by the first video communication terminal and the MCU;

(a4) sending the MCU a request for sending a SiteCall information by the first video communication terminal;

(a5) sending a response of the request for sending a SiteCall information to the first video communication terminal by the MCU;

(a6) when the first video communication terminal has received a positive response of the request for sending a SiteCall information, sending a conference information needed for convening a conference to the MCU through the In-Band channel; and (a7) sending a response for the SiteCall information to the first video communication terminal by the MCU.

9. The method according to claim 1, wherein the In-Band channel is a MLP channel, a H-MLP channel, a LSD channel, a HSD channel or a BAS channel.

10. The method according to claim 1, wherein the In-Band channel is 6.4 kbps bit speed.

11. The method according to claim 1, wherein the step (d) further comprises:
(d1) making capability exchange and mode switching with the first video communication terminal by the MCU, according to the received conference information; and
(d2) calling other video communication terminals of the conference to attend the conference and starting a video communication service by the MCU, according to the received conference information.

12. The method according to claim 1, wherein at the beginning of a conference the first video communication terminal is the chairman video communication terminal of the conference in default.

13. The method according to claim 1, further comprising:
sending an adding conference sites information to the MCU by a chairman video communication terminal through the In-Band channel between the chairman video communication terminal and the MCU;
sending an adding conference sites response to the chairman video communication terminal by the MCU; and
establishing connection with video communication terminals to be added by the MCU, according to the adding conference sites information.

14. The method according to claim 1, further comprising:
after authentication, sending a control connection request to a MCU by a video communication terminal of the conference through the In-Band channel between the video communication terminal and the MCU; receiving or rejecting the control connection request by the MCU;
if in step (f), the control connection request is received, sending one or more than one conference control requests to the MCU through the In-Band channel by the video communication terminal; and
making response of conference control requests from the video communication terminal by the MCU.

15. The method according to claim 1, wherein the step (d) further comprises:
(d2) calling other video communication terminals of the conference to attend the conference and starting a video communication service by the MCU, according to the received conference information.

16. A message data form for a video communication service, is characterized that comprising a data starting mark field, a data type field, a data length field, a field for no less than one piece of sub-information, a data ending mark field and a cyclic redundancy check for recording conference information defined by a first video communication terminal, wherein
the conference information comprises sub-information for a conference, sub-information for conference sites, and common sub-information for a conference and conference sites; and
the conference information in the message data form are adapted to be transferred to an MCU through an In-Band channel established between the first video communication terminal and the MCU for the video communication service and to be used to convene the conference by the MCU.

17. The message data form according to claim 16, wherein a specific bit in the data type field is defined as an extended bit, the value of which defines whether the next byte is also a data type byte.

18. The message data form according to claim 16, wherein the sub-information comprises: a sub-information type field, a sub-information length field and a sub-information data field.

19. The message data form according to claim 18, wherein a specific bit in the sub-information type field is defined as an extended bit, the value of which defines whether the next byte is also a sub-information type byte.

* * * * *

UNITED STATES PATENT AND TRADEMARK OFFICE
CERTIFICATE OF CORRECTION

PATENT NO. : 7,808,522 B2
APPLICATION NO. : 10/373062
DATED : October 5, 2010
INVENTOR(S) : Yufeng Zhang et al.

Page 1 of 1

It is certified that error appears in the above-identified patent and that said Letters Patent is hereby corrected as shown below:

Column 12, Claim 16, line 17, delete "that" and insert -- by --.

Signed and Sealed this
Sixteenth Day of August, 2011

David J. Kappos
*Director of the United States Patent and Trademark Office*